US012662404B1

(12) United States Patent
Tompkins et al.

(10) Patent No.: US 12,662,404 B1
(45) Date of Patent: Jun. 23, 2026

(54) SYSTEM FOR CO-GENERATION OF HYDROELECTRIC POWER AND PURIFIED WATER, CONFIGURED FOR THE REMOVAL OF MICROPLASTIC PARTICULATES, VOLATILE ORGANIC COMPOUNDS (VOCS), HEAVY METALS, AND ORGANIC WASTE, FOR MUNICIPALITIES AND THE LIKE

(71) Applicant: Remedion LLC, Warwick, RI (US)

(72) Inventors: Alexander Tompkins, Katonah, NY (US); James Prongay, Merrick, NY (US)

(73) Assignee: Remedion LLC, Warwick, RI (US)

( * ) Notice: Subject to any disclaimer, the term of this patent is extended or adjusted under 35 U.S.C. 154(b) by 342 days.

(21) Appl. No.: 18/449,808

(22) Filed: Aug. 15, 2023

Related U.S. Application Data

(63) Continuation-in-part of application No. 18/449,756, filed on Aug. 15, 2023.
(Continued)

(51) Int. Cl.
*C02F 9/00* (2023.01)
*F03B 13/08* (2006.01)
(Continued)

(52) U.S. Cl.
CPC ................ *C02F 9/00* (2013.01); *F03B 13/08* (2013.01); *C02F 1/004* (2013.01); *C02F 1/325* (2013.01);
(Continued)

(58) Field of Classification Search
CPC .......... C02F 1/004; C02F 1/325; C02F 1/441; C02F 1/685; C02F 9/00; C02F 2101/20;
(Continued)

(56) References Cited

U.S. PATENT DOCUMENTS

| | | | |
|---|---|---|---|
| 8,944,253 B2 | 2/2015 | Ward | |
| 2005/0029174 A1* | 2/2005 | Collins | ................... C02F 11/18 |
| | | | 210/243 |

(Continued)

FOREIGN PATENT DOCUMENTS

WO     WO 2021/003474     1/2021

OTHER PUBLICATIONS

Josh Hrala, "Microbeads Could Be Turning The Fish We Eat Toxic, Study Finds," Aug. 16, 2016, Science Alert, www.sciencealert.com/microbeads-are-causing-the-fish-we-eat-to-be.
(Continued)

*Primary Examiner* — Akash K Varma
(74) *Attorney, Agent, or Firm* — Thomas A. O'Rourke; James Bongiorno; O'Rourke IP Law, PLLC

(57) ABSTRACT

A system accomplishes electricity generation and water purification, and includes a water reservoir and a conduit with a first opening in fluid communication with a top of the reservoir. A second opening is at a lower height than the first opening (the conduit is downwardly disposed), so gravitational potential energy creates a flow of water down the conduit. A turbine in the conduit is thereby rotated, enabling a generator to create alternating current, which is transmitted to a municipal power grid. Water from the conduit's second end is pumped through: a filtration system to remove volatile organic compounds, heavy metals, and particulates; a sterilization unit emitting ultraviolet light that kills microbes; and a reverse osmosis unit that removes micro plastic particles. A re-mineralization adds key minerals to improve healthfulness of the microplastic free water. A system outtake delivers the re-mineralized microplastic-free water to a municipal water distribution system.

11 Claims, 6 Drawing Sheets

300

Related U.S. Application Data

(60) Provisional application No. 63/387,344, filed on Dec. 14, 2022.

(51) Int. Cl.

| | |
|---|---|
| *C02F 1/00* | (2023.01) |
| *C02F 1/32* | (2023.01) |
| *C02F 1/44* | (2023.01) |
| *C02F 1/68* | (2023.01) |
| *C02F 101/20* | (2006.01) |
| *C02F 101/32* | (2006.01) |

(52) U.S. Cl.
CPC .............. *C02F 1/441* (2013.01); *C02F 1/685* (2013.01); *C02F 2101/20* (2013.01); *C02F 2101/322* (2013.01); *C02F 2201/005* (2013.01); *C02F 2201/009* (2013.01); *C02F 2209/03* (2013.01); *F05B 2220/706* (2013.01)

(58) Field of Classification Search
CPC .......... C02F 2101/322; C02F 2201/005; C02F 2201/009; C02F 2209/03; B03D 1/1431; B07B 1/02; F03B 13/08
USPC .......................................................... 210/90
See application file for complete search history.

(56) References Cited

U.S. PATENT DOCUMENTS

| | | | |
|---|---|---|---|
| 2011/0257788 A1* | 10/2011 | Wiemers ................. | C02F 1/463 700/271 |
| 2014/0138288 A1* | 5/2014 | Ward ........................ | B07B 1/02 209/12.2 |
| 2022/0274852 A1* | 9/2022 | Turner ................. | B03D 1/1431 |

OTHER PUBLICATIONS

Nitrogen-Fixing Baceria, 2022, Science Direct, available at: www.sciencedirect.com/topics/agricultural-and-biological-sciences/nitrogen-fixing-bacteria.

BioTec 38000 ScreenMatic (MPN 42976) filter, Oase, 2022, available at: https://webbsonline.com/Item/Oase-BioTec-38000-ScreenMatic-MPN-42976.

Heating Systems, Selecting the Best Aquaculture Water Heater for Your System, Oase, 2022, available at: www.integrated-aqua.com/subcategories/heating-systems.

Biomaster Thermo 600, Oase, 2022, available at: https://store.oase-usa.com/products/oase-biomaster-thermo-600.

Archismita Misra, "Water purification and microplastics removal using magnetic polyoxometalate-supported ionic liquid phases," Angewandte Chemie Int'l Ed. 59.4(2020) 1601-1605.

Mohsen Padervand, "Removal of microplastics from the environment. A review," Environmental Chemistry Letters 18 (2020): 807-828.

T. C. Brown, V. Mahat, and J. A. Ramirez, "Adaptation to Future Water Shortages in the United States Caused by Population Growth and Climate Change," Earth's Future, 7, 219-23.

F. Mohammadi, et al., "Can Desalination be an Economically Viable Solution for Water Scarcity?," 2019 IEEE Global Humanitarian Technology Conference, Seattle, WA, 2019, pp. 1-4.

Hydro Scientific HF6H-316-12F12, Filter Housing, https://www.servapure.com/Hydro-Scientific-HF6H-316-12F12-SB-12-x-60-Single-High-Flow-Filter-Housing-3600-GPM_p_12471.html.

* cited by examiner

1

SYSTEM FOR CO-GENERATION OF HYDROELECTRIC POWER AND PURIFIED WATER, CONFIGURED FOR THE REMOVAL OF MICROPLASTIC PARTICULATES, VOLATILE ORGANIC COMPOUNDS (VOCS), HEAVY METALS, AND ORGANIC WASTE, FOR MUNICIPALITIES AND THE LIKE

CROSS-REFERENCES

This application is a continuation-in-part of U.S. patent application Ser. No. 18/449,756, filed on Aug. 15, 2023, which claims priority on U.S. Provisional Patent Application Ser. No. 63/387,344, filed on Dec. 14, 2022, all disclosures of which are incorporated herein by reference. This application also incorporates by reference the disclosures of Applicant's co-pending U.S. patent application Ser. No. 18/134,075, filed on Apr. 13, 2023.

FIELD OF THE INVENTION

The subject technology relates generally to electric power generation and water purification, and more particularly to a system that is adapted for concurrent co-generation of alternating current for a municipality or the like, and for efficient and effective removal of micro-contaminants such as microplastic particulates, volatile organic compounds (VOCs), heavy metals (e.g., lead, mercury, copper, cadmium, chromium (III and VI), arsenic, barium, radium, selenium), and organic waste from drinking water; for re-mineralizing of the microplastic-free water; and for bottling of the filtered mineral water.

BACKGROUND OF THE INVENTION

Polluting of the earth's environments is a growing problem, and of particular importance is water pollution, which is exemplified by the water crisis in Flint Michigan beginning around 2014, when the city switched its water source from Lake Huron and the Detroit River to the Flint River. The switch caused distribution pipes to corrode and the leaching of lead and *Legionella* bacteria into municipal drinking water.

In 2022, a failure of the largest water treatment plant in Jackson, Mississippi resulted in 160,000 residents, hospitals, fire stations and schools being without safe drinking water. Other water crises include, but are not limited to, the finding of arsenic in tap water in public housing in New York City, and the finding of *E-coli* bacteria in the water supply of West Baltimore.

Passage of the Bipartisan Infrastructure Law (i.e., the Infrastructure Investment and Jobs Act-IIJA) in 2021 was intended to address aspects of such crises, as it provides funding for 83 projects in 11 to states to improve local water systems, including replacement of lead pipes in public water lines.

However, water source problems are only expected to grow worse. According to research by Colorado State University almost half of the U.S. freshwater basins studied will be inadequate for supplying the monthly water demand projected by the year 2071. At the root of the problem is that desalination is currently not economically viable, and only 2.5% of Earth's water is freshwater, most all of which is underground. See e.g., "Adaptation to Future Water Shortages in the United States Caused by Population Growth and Climate Change," T. C. Brown. V. Mahat, and J. A. Ramirez, *Earth's Future,* 7, 219-234 (2019); and "Can Desalination be an Economically Viable Solution for Water Scarcity?," F. Mohammadi, M. Sahraei-Ardakani, Y. Al-Abdullah and G. T. Heydt, 2019 *IEEE Global Humanitarian Technology Conference (GHTC)*, Seattle, WA, USA, 2019. pp. 1-4.

In addition, plastic pollution has become the most prevalent type of pollutant in rivers, lakes, and oceans. Once a plastic bottle or other plastic container is discarded into the marine environment, it breaks down into microplastics, as a result of photolytic, mechanical, and biological degradation. Microplastics are roughly the size of a sesame seed (less than 5 mm). Smaller plastics also pollute the waterways as a result of manufactured polyethylene (microbeads) that are deliberately introduced into health and beauty products (e.g., cleansers and toothpastes), and which may escape ordinary filtration systems after the product has been used by the purchaser.

The impact of microbeads and microplastic pollution in lakes and oceans is significant because they can be intentionally ingested by aquatic life believing the plastic to be food, which may pose downstream health risks to humans, particularly because the consumption of seafood globally has roughly doubled in the last fifty years. Estimates vary, but conservatively speaking, at least 100 million tons of seafood is consumed by people annually.

Studies have shown that microplastics are present in the fillets and livers of many species of fish. See e.g., *Marine Pollution Bulletin*, "Presence and Characterization of Microplastics in Fish of Commercial Importance from the Biobio Region in Central Chile," by Karla Pozo et al., 140 (2019); and see, Ocean Conservancy, "I eat Fish, am I eating Microplastic," Oct. 18, 2021, available at: https://oceanconservancy.org/blog/2021/10/18/eating-microplastics/). See also, Annals of Internal Medicine, "Detection of Various Microplastics in Human Stool," by Philipp Schwabl et al., 453-457 (2019) ("This study is, to our knowledge, the first to provide evidence for the presence of microplastics . . . "); and see, *Environment International*, "Plasticenta: First Evidence of Microplastics in Human Placenta," by Antonio Ragusa et al., 146 (2021): 106274.

These ingested plastics, including when found in the stomachs of fish, attract and serve to concentrate toxic chemicals that are known to cause neurological problems, and to cause immune function and fertility issues, etc. See e.g., Science Alert, "Microbeads Could be Turning the Fish We Eat Toxic, Study Finds," Aug. 17, 2016, available at: www.sciencealert.com/microbeads-are-causing-the-fish-we-eat-to-become-toxic-study-finds; see also: *Ecotoxicology and Environmental Safety*, "Bioavailability and Toxicity of Microplastics to Fish Species: a Review," by Wenfeng Wang, Jing Ge, and Xiangyang Yu, 189 (2020); and see, *Science of the Total Environment*, "Evaluation of Uptake and Chronic Toxicity of Virgin Polystyrene Microbeads in Freshwater Zebra Mussel *Dreissena polymorpha* (Mollusca: Bivalvia)," by Magni, Stefano, et al., 631 (2018): 778-788.

There has also been a long felt but unmet need for the ability of a municipality to concurrently generate electricity and to effectively and efficiently remove particulates such as microplastic from public drinking water supplies, all within a single system.

The herein disclosed system addresses these unmet needs.

It is noted that the citing of any reference within this disclosure, i.e., any patents, published patent applications, and non-patent literature, is not an admission regarding a determination as to its availability as prior art with respect to the herein disclosed and claimed method/apparatus.

OBJECTS OF THE INVENTION

It is an object of the invention to provide a system that enables the co-generation of electricity and more effective filtration of drinking water in a single system.

It is another object of the invention to provide an effective and efficient system for the filtering of microplastic from drinking water.

It is a further object of the invention to provide an effective and efficient system for the filtering of microplastic from drinking water and for re-mineralizing of the filtered water.

It is another object of the invention to provide an effective and efficient system for the filtering of microplastic from drinking water, for re-mineralizing of the filtered water, and for bottling of the microplastic-free re-mineralized water all within a single system.

It is a further object of the invention to provide an effective and efficient system for removing microplastic from drinking water, and for re-mineralizing of the filtered water, within a single system that can be retrofit into mass drinking water systems (public water fountains) and/or household drinking systems.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system is configured for a municipality to accomplish both hydroelectric power generation and water purification and re-mineralization of the water, all within a single system. The system includes a reservoir with at least one wall that has a height that is configured to store a volume of water suitable for serving the population of a particular municipality. The reservoir may be supplied with water through a tube or trough that may be obtained from a natural body of water, such as a lake or river. The tube/trough may preferably be configured to admit water into a top portion of the reservoir.

A conduit has an opening at a first end being in fluid communication with a top portion of the reservoir and an opening at a second end being positioned at a lower height than the opening at the first end, such that the conduit is disposed in a downward direction. The downward orientation of the conduit permits gravitational potential energy resulting from a height differential between the first opening and the second opening to create a flow of water from the reservoir down the conduit.

A turbine is secured in the conduit at a position between the first end and the second end, so that blades of the turbine will rotate as a result of the flow of water down the conduit. The turbine may preferably be at a position in the conduit being in closer proximity to the second end than the first end. A generator is mechanically coupled to the turbine, and is configured to convert rotational kinetic energy obtained from turbine into alternating current. A power line may transmit the generated alternating current to a municipal power grid. A transformer may be used to convert the alternating current generated by the generator into a higher voltage current.

A pump is configured to receiver water from the second end of the conduit and to pump the water through a water purification and re-mineralization system. The water purification and re-mineralization system may include: a filtration system that removes volatile organic compounds, heavy metals, and particulates; a sterilization unit that emits ultraviolet light that kills any microbes present in the filtered water; and a reverse osmosis unit that removes micro plastic particles from the filtered water. The sterilization unit preferably emits ultraviolet light at a wavelength between 200-280 nanometers, which has been shown to be more effective at killing bacteria, viruses, and fungi. The reverse osmosis unit may have a first outtake configured for discharge of filtered micro plastic particles and wastewater to a municipal sewer system, and a second outtake configured to deliver micro plastic free water to the municipality.

The system may also include a re-mineralization unit that adds key minerals to the microplastic-free water to improve the healthfulness of the microplastic free water. A system outtake may deliver the re-mineralized microplastic-free water to a municipal water distribution system or a bottling facility.

One or more valves may be positioned throughout the system, such that each may be actuated to shut off (and subsequently to turn on) the water flow at a particular location. Also, one or more pressure gauges may be positioned throughout the system to measure pressure at that location, which may be used in conjunction with a needle valve to adjust the water pressure to be below a safe upper limit, and to control a water flow rate.

BRIEF DESCRIPTION OF DRAWINGS

The description of the various example embodiments is explained in conjunction with the following appended drawings.

FIG. 3 illustrates components and an arrangement, which includes a reservoir, for a system configured for hydroelectric power generation and water purification for municipalities and the like.

DETAILED DESCRIPTION OF THE INVENTION

Figure 1:
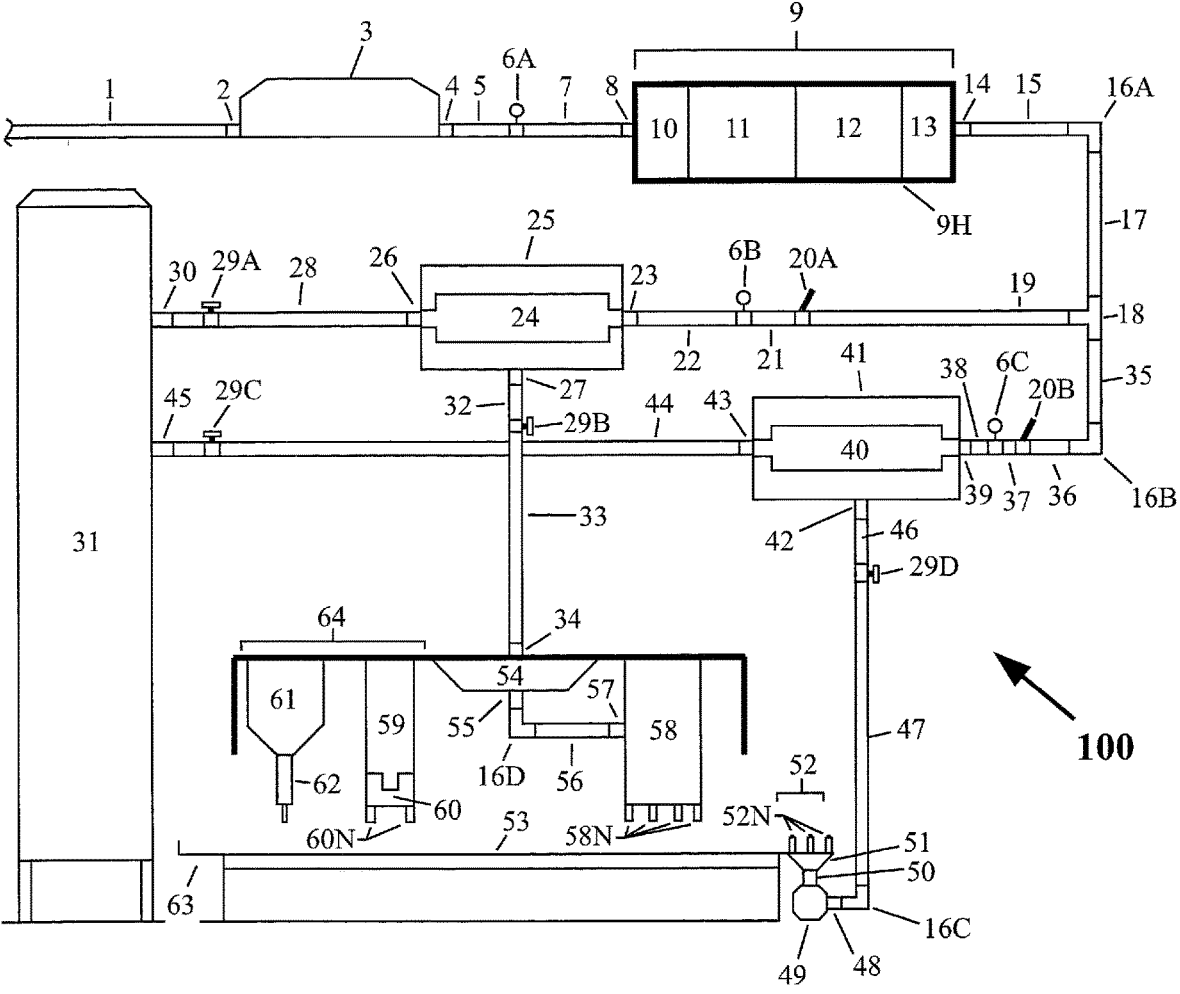
FIG. 1 is a flow chart illustrating components of a first embodiment of a water filtration system that is configured for removing particulates including microplastic from drinking water, for re-mineralizing of the microplastic-free water for more healthful human consumption from drinking water, and for bottling of the microplastic-free re-mineralized water.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with design variations described in the specification, as well as applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified (see e.g., *Ex Parte Oll-mar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

FIG. 1 is a flow chart illustrating components of a filtration, remineralization, and bottling system 100 that is particularly adapted for removing microplastics from drinking water, for re-mineralizing of the microplastic-free filtered water, and for subsequent bottling of the microplastic-free mineral water.

The system 100 may have an input water pipe 1, which may provide a supply of fresh water or salt water to the system from a water source. The pipe 1 may be coupled to a primary circulating pump 3 via an intake 2. The primary circulating pump 3 may create a total system pressure of 60 psi to 80 psi for delivery of a flow of the supply water to a pre-filtration unit 9. The primary circulating pump 3 may deliver the flow of supply water via an outtake 4 to a pipe 5, which may be in fluid communication with an intake 8 to the pre-filtration unit 9 via a pressure gauge 6A and pipe 7. The pressure gauge 6A, as well as each of the other pressure gauges described herein (e.g., pressure gauges 6B and 6C) may be configured to measure water pressure up to at least 120 psi.

The pre-filtration unit 9 may be housed in a 300 series stainless steel housing 9H. A suitable housing may be the Hydro Scientific HF6H-316-12F12 made by the ServApure Company in Bay City, Michigan. Assembled into the housing 9H of the pre-filtration unit 9 may be:

one or more primary sediment filtration screens 10;

a primary carbon filter 11;

a secondary carbon filter 12; and one or more secondary sediment filtration screens 13.

Each of the primary and secondary sediment filtration screens 10/11 may be formed of 300 series steel, having openings of 5 microns or smaller. Also, each of the primary and secondary carbon filters 11/12 may be formed of a solid block of compressed carbon material formed for filtering particles of 5 microns or smaller.

The pre-filtered water may exit the pre-filtration unit 9 via outtake 14, which may be in fluid communication with a pipe 15, an elbow joint 16A, a pipe 17, and a T-joint 18, where the T-joint 18 may be in fluid communication with each of a primary reverse osmosis unit 25 and a secondary reverse osmosis unit 41. It is noted that different piping arrangements may be used other than what is shown herein, and that certain elements disclosed herein such as the elbow joint(s) (or alternatively just curved bends) may be utilized to produce a more compact arrangement, particularly one that may permit at least a portion of the system 100 (i.e., the microplastic-free filtration portion) to be retrofit into a mass drinking water system and/or a household drinking system.

The T-joint 18 may be in fluid communication with an intake 23 of the primary reverse osmosis unit 25 via a pipe 19 that may be is in fluid communication with a needle valve 20A that is used to control water pressure, a pipe 21, a pressure gauge 6B, a pipe 22. The primary reverse osmosis unit 25 may include a ceramic reverse osmosis membrane 24 that has a filtration accuracy of 0.0001, to remove microplastic particulates from the filtered water from the pre-filtration unit 9.

The filtration accuracy of the ceramic reverse osmosis membrane 24 being 0.0001 microns or 1 nanometer, means that it can separate dissolved solids and particulate from water that is/are 0.0001 microns or larger, which includes microplastics and other micropollutants.

The microplastic free water may exit the primary reverse osmosis unit 25 via an outtake 27, and be in fluid communication with the intake 34 of a bottling station pressure pump 54, via a pipe 32, a ball valve 29B, and a pipe 33. The bottling station pressure pump 54 may supply microplastic-free water under pressure to the intake 57 of the bottle filling unit 58, via an outtake 55 of the bottling station pressure pump 54 that may be in fluid communication with an elbow joint 16D, and a pipe 56. The bottle filling unit 58 may include a plurality of output nozzles 58N that may be used to fill a corresponding plurality of prewashed bottles (glass and/or plastic) with the microplastic free water produced by the primary reverse osmosis unit 25. The bottles may be automatically positioned under the output nozzles 58N using a conveyor belt 53. See e.g., U.S. Pat. No. 2,775,269 to Breeback; U.S. Pat. No. 4,053,003 to Ferrero; and U.S. Pat. No. 4,467,847 to Zodrow.

The conveyor belt 53 may thereafter transport the bottles filled with the microplastic-free water to a bottling and remineralization station 64. The bottling and remineralization station 64 may include a remineralization unit 59 that has a mineral storage area, and a mineral dispenser 60 that has one or more mineral dispenser nozzles 60N. The bottle may thus be transported by the conveyor belt 53 to sequentially underlie the mineral dispenser nozzles 60N which may dispense a select quantity of particular healthy minerals into the microplastic free water contained in the bottle, minerals that may include, but is not limited to, calcium carbonate, magnesium sulfate, potassium, sodium sulfate, etc.

The conveyor belt 53 may thereafter transport the bottles filled with the re-mineralized microplastic-free water to a sealing unit (61) that may include a storage/hopper area to maintain a supply of caps or corks. A corking piston 62 may be used to install the cork in the bottle. See, e.g., U.S. Pat. No. 1,773,868 to Saviano, and United Kingdom Patent No. GB189817671A. Alternatively, the bottle may be capped using a metal or plastic cap. See e.g., U.S. Pat. No. 4,939,890 to Peronek. Once the bottles filled with re-mineralized microplastic-free water have been corked or capped, the conveyor belt 53 may transport them to a storage area 63.

As seen in FIG. 1, the microplastic free water may be redirected from the primary reverse osmosis unit 25, when the bottle filling unit 58 may be halted for any reason (or may be operating slower than the filtration portion of the system), to a discharge storage tank 31, The microplastic free water may be redirected to the primary intake 30 of the discharge storage tank 31 via an outtake 26 that is in fluid communication with a pipe 28, and a ball valve 29A. The ball valve 29A may be used to allow or alternatively to stop the flow of water into the discharge storage tank 31, which valve may be electrically coupled to the bottle filling unit 58 to thereby be controlled to open or close automatically in response to the operating speed of the bottling unit.

It is also very important for the purity of the water contained in the bottles being bottled by the system 100 that the empty bottles being filled are themselves microplastic-free; therefore, the system may also include a bottle washing station 52. The bottle washing station 52 may include one or more cleaning nozzles 52N, each of which may spray microplastic-free water (either upward or downwardly) into the interior of the bottle(s) that may be positioned over/under the nozzle, to rinse the bottle interior sufficiently to become free of any microplastic particles (note that a mechanism may be employed to invert the bottles to be properly positioned to be filled by the plurality of output nozzles 58N of the bottle filling unit 58). For that reason, the use of a glass bottle and a cork may provide for greater purity of the bottled microplastic-free water, as plastic particulates may inherently detach/leach from the interior of a plastic bottle and/or from a plastic cap into the purified water, to thereby reduce the effectivity of the system and the bottled water produced therefrom. See e.g., "Bottled Water Fans are Ingesting Small Pieces of Plastic, Report Says," by Amy Martyn, Consumer Affairs, Mar. 16, 2018: " . . . their findings suggest that the plastic is coming from the actual bottling process . . . 'I think that most of the plastic that we are seeing is coming from the bottle itself, it is coming from the cap, it is coming from the industrial process of bottling the water' . . . "

The microplastic-free water that is used by the bottle washing station 52 may be supplied by the secondary reverse osmosis unit 41 of the system 100. As seen in FIG. 1, the T-joint 18 may also be in fluid communication with the intake 39 of the secondary reverse osmosis unit 41 via a pipe 35, an elbow joint 16B, a pipe 36, a needle valve 20B, a pipe 37, a pressure gauge 6C, and a pipe 38. The secondary reverse osmosis unit 41 may also include a ceramic reverse osmosis membrane 24 that has a filtration accuracy of 0.0001, the same as the primary reverse osmosis unit 25. The microplastic-free water that exits the outtake 42 of the secondary reverse osmosis unit 41 may be in fluid communication with an intake 48 of a bottle washing pressure pump 49 via a pipe 46, a ball valve 29D, a pipe 47, and an elbow joint 16C. The outtake 50 of the bottle washing pressure pump 49 may be in fluid communication with the cleaning nozzle(s) 52N via a pipe 51. As noted above, other piping arrangements for fluid communication of the water may alternatively be used.

As seen in FIG. 1, the microplastic free water may be redirected from the secondary reverse osmosis unit 41, when the bottle washing station 52 may be halted for any reason (or may be operating slower than the corresponding filtration portion of the system), to the discharge storage tank 31, The microplastic free water may be redirected to the secondary intake 30 of the discharge storage tank 31 via an outtake 43 that is in fluid communication with a pipe 44, and a ball valve 29C. The ball valve 29C may be used to allow or alternatively to stop the flow of water into the discharge storage tank 31, which valve may be electrically coupled to the bottle washing station 52 to thereby be controlled to open or close automatically in response to the operating speed of the bottling washing station.

Figure 1A:
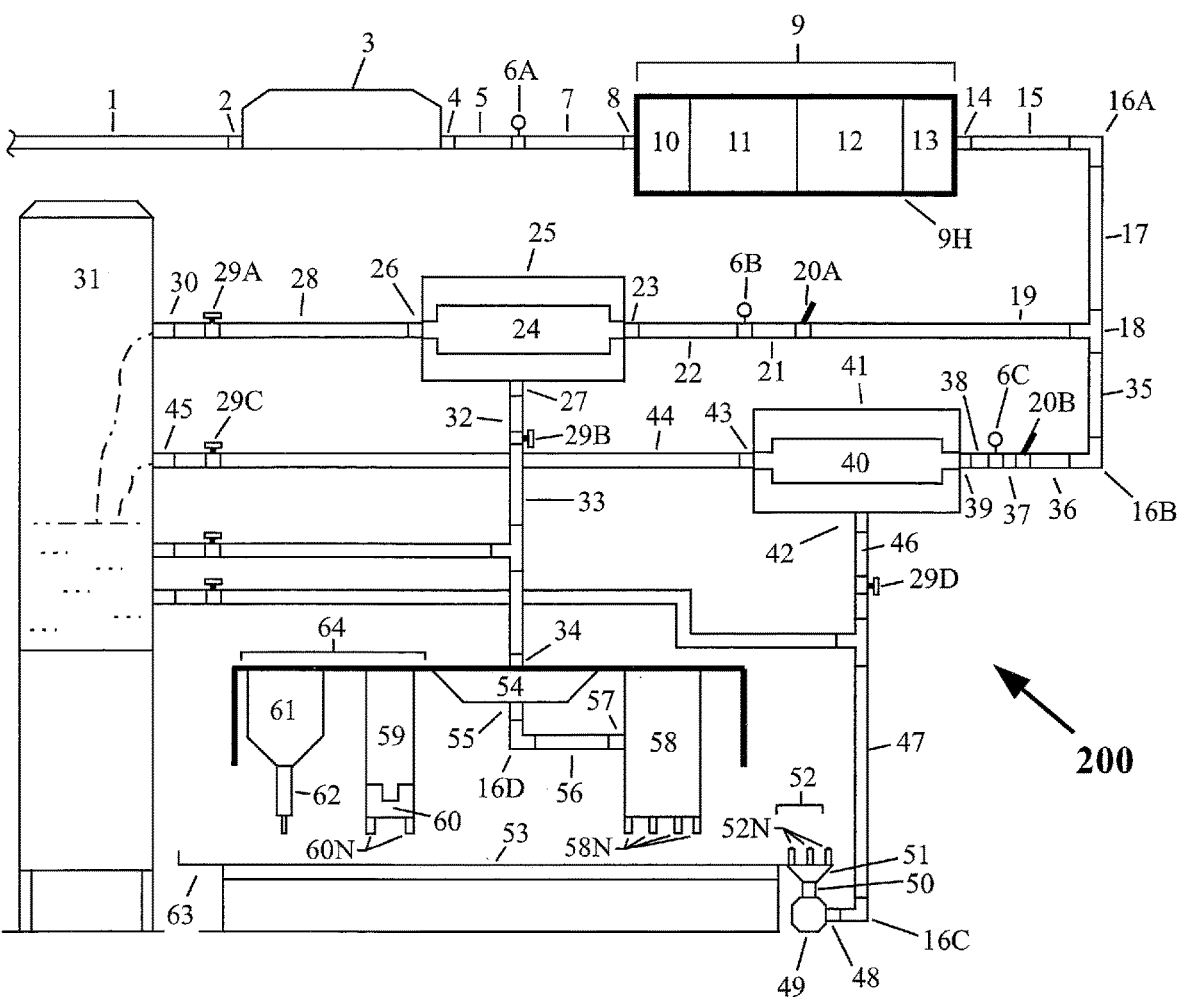
FIG. 1A illustrates components of a second embodiment that is the same as the embodiment of FIG. 1, but which includes a supplemental supply of microplastic-free water from the discharge tank to the bottle washing station and/or the bottle filling station.

FIG. 1A is a flow chart illustrating the components of a filtration, remineralization, and bottling system 100' that is the same as system 100, but which may also provide a supplemental supply of microplastic-free water to the bottle washing station 52 and the bottle filling station 58 from the discharge tank 31.

Figure 1B:
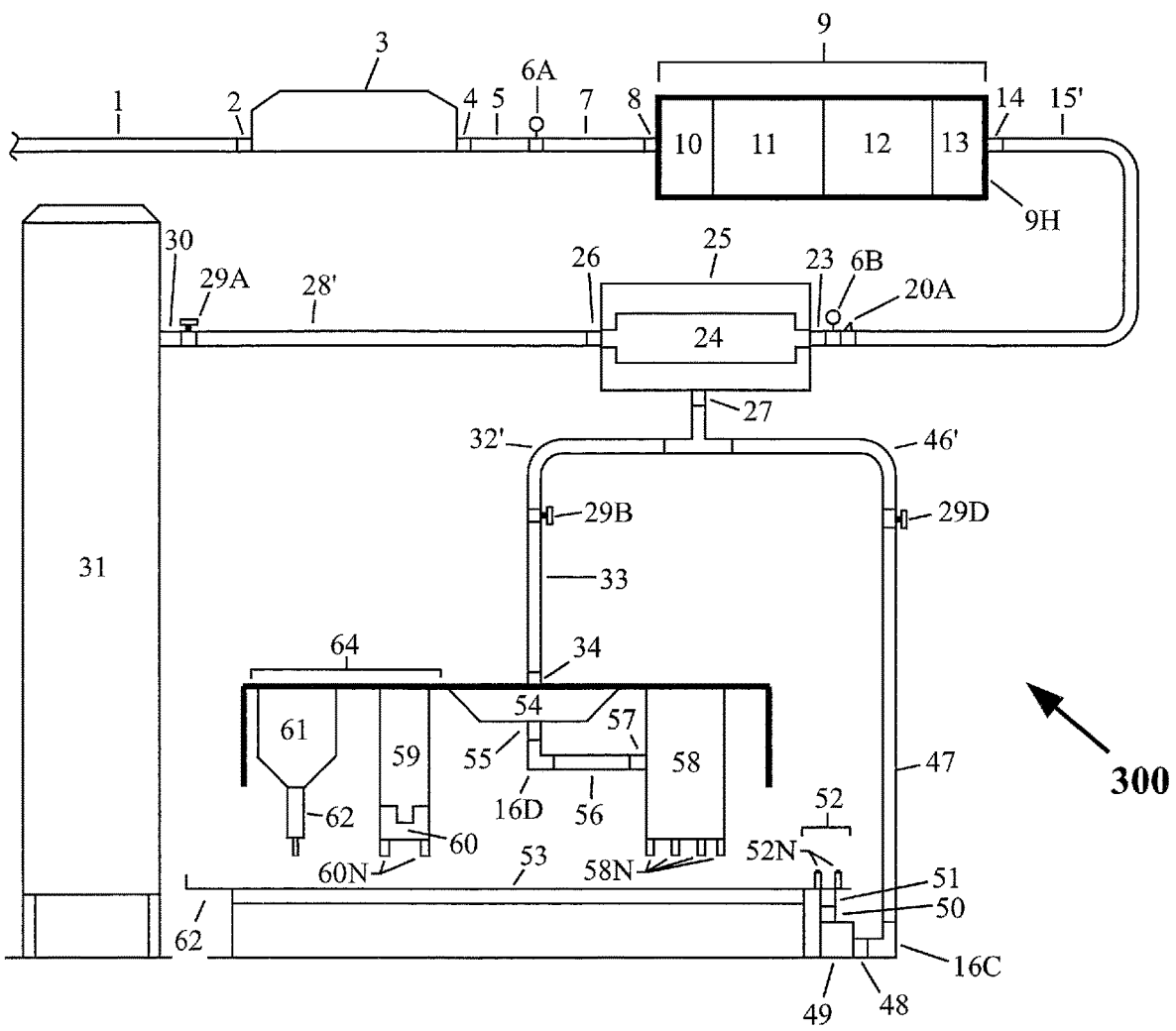
FIG. 1B illustrates components of a third embodiment of a system that is the same as the embodiment of FIG. 1, but which uses only one reverse osmosis unit to supply microplastic-free water to both the bottle washing station and a bottle filling station.

FIG. 1B is a flow chart illustrating components of a filtration, remineralization, and bottling system 100'' that is the same as system 100, but which uses only one reverse osmosis unit, i.e. reverse osmosis unit 25, to supply microplastic-free water to both the bottle washing station 52 and a bottle filling station 58. The system 100'' also eliminates certain pipes, elbow joints, etc. that are used in system 100, through the use of bent/curved pipes, such as pipe 15', pipe 28', pipe 32', and pipe 46', and also by repositioning certain components, such as pressure gauge 6B and needle valve 20A.

However, it is noted that use of both the primary reverse osmosis unit 25 and the secondary reverse osmosis unit 41 in system 100 may be advantageous to extend the membrane life of the primary reverse osmosis unit, because it is filtering a high volume of water. Additionally, for maintenance and quality assurance reasons, having two reverse osmosis units permits independent testing of each of the microplastic-free product water that is delivered by the system and the microplastic-free water that is used for cleaning the bottles, and further permits replacement of each membrane when needed.

Figure 2:
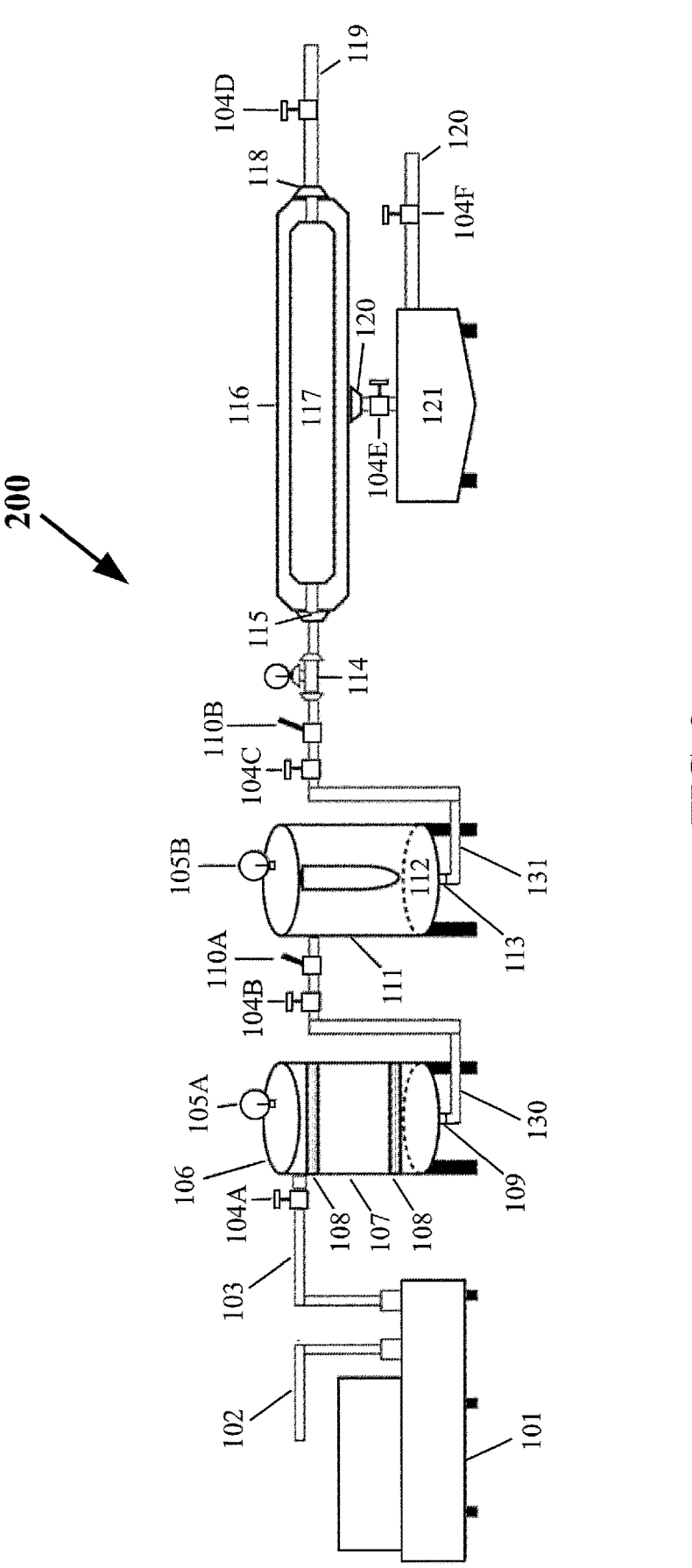
FIG. 2 illustrates components of a water filtration system for a municipality that is configured for removing particulates including microplastic from drinking water, for re-mineralizing of the microplastic-free water for more healthful human consumption.

FIG. 2 is a flow chart illustrating components of a water filtration system 200 that is configured for removing microplastic and other impurities from drinking water, and which is configured for use by a municipality. Certain aspects of the water filtration system 200 may be constructed the same as or similar to those of water filtration system 100. Water filtration system 200 incudes a centrifugal pump 101 that is capable of producing flow rates of at least 3000 gallons/minute. A source water intake 102 to the centrifugal pump 101 may provide for the input of water that can be from any source, regardless of salinity. Water under pressure may exit an outtake 103 of the centrifugal pump 101, and may be piped via pipe 103 to a carbon/sediment filtration unit 106. A ball valve 104a in that pipe may be used to turn on or turn off the flow of water from the centrifugal pump 101 to the carbon/sediment filtration unit 106. The other ball valves shown in the flow chart (i.e., 104b, 104c, 104d, 104e, and 104f) may be used to turn on or off the flow of water at other locations in the system.

The carbon/sediment filtration unit 106 is used to remove volatile organic compounds (VOCs), some heavy metals, and particulates that are larger than 5-microns. The carbon/sediment filtration unit 106 may be formed of a stainless-steel housing that may house: a first 5-micron mesh screen 108 that may be made of stainless steel; a chamber 107 that may contain activated carbon for removing volatile organic compounds, some nonorganic chemicals, and heavy metals from the water; and a second 5-micron mesh screen 108. The water may exit the carbon/sediment filtration unit 106 via an outtake 109 and may be piped to a UV sterilization unit 111 using pipe 130, which pipe may include a pressure gauge 105A that may be used in conjunction with a needle valve 110A to ensure that the water pressure is within safe parameters, and which may also be used to control the flow rate of water from the unit.

The needle valve 110A may cooperate only with pressure gauge 105A. There is a one-to-one relationship between needle valves and pressure gauges. A needle valve needs to be placed before a pressure gauge to accurately determine the increase or decrease in pressure you are exerting on the system by operating the needle valve. The combination of needle valve 110A and pressure gauge 105A co-acting together may ensure safe operating pressure at the location in the system, more specifically it is there before the UV sterilization unit 111 of the system to ensure that it is not fouled, e.g., not cracked/damaged by excess pressure.

The UV sterilization unit 111 may include one or more UV light bulbs/elements 112 each configured to emit light capable of eliminating microbes such as bacteria and viruses. The sterilized water may exit the UV sterilization unit 111 via an outtake 113, and may then be piped using pipe 131 into a reverse osmosis unit 116 via an intake port 115. The pipe 131 may include an inline pressure gauge 114 that may be used in conjunction with a needle valve 110B to ensure that the water pressure is within safe parameters, and which may also be used to control the flow rate of water from the UV sterilization unit 111 to the reverse osmosis unit (116).

The reverse osmosis unit 116 may include a ceramic reverse osmosis membrane 117 that has a filtration accuracy of 0.0001, and may be used to remove micro plastic particles from the filtered water. Wastewater including the filtered micro plastic may be discharged from the reverse osmosis unit 116 via a discharge water outtake 118, and may be discharged via pipe 119 to a municipal sewer system or other safe system for disposal or use of the micro plastic. A second outtake, outtake 120, may be used to deliver micro plastic free product water to a re-mineralization unit 121 that may be used to re-mineralize the microplastic free water, making it safe and healthful for human consumption. The re-mineralized water may exit the re-mineralization unit 121 via a pipe 122 that may deliver re-mineralized microplastic free water to a main water distribution system utilized by the municipality.

Figure 3:
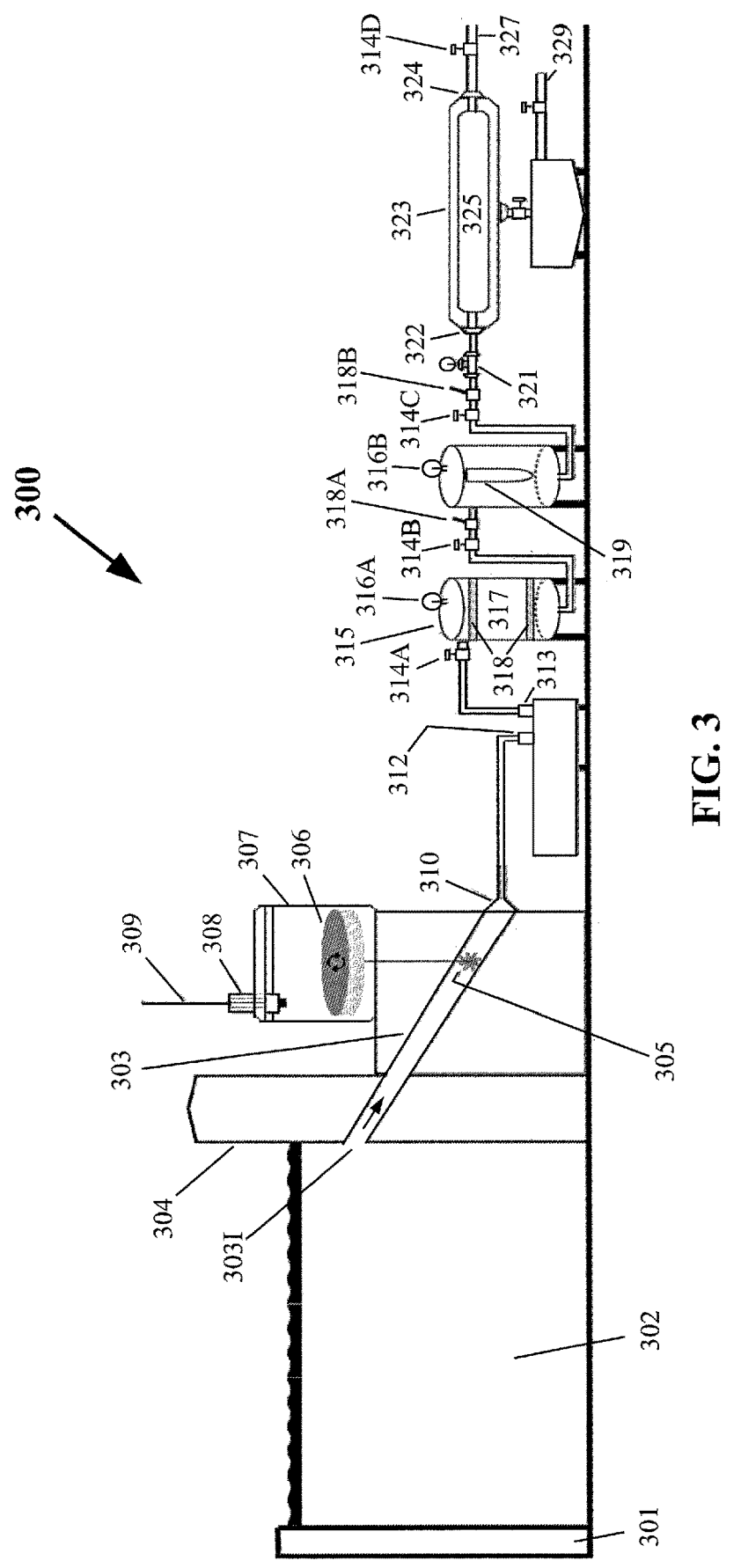

FIG. 3 illustrates components and an arrangement for a system 300 configured to produce electric power and to accomplish water purification, with the system being particularly advantageous for municipalities and the like.

The electric generating and water purifying system 300 may include a reservoir 302 that may be sized and positioned to store a particular volume of source water, and a downwardly angled conduit 303, which conduit may have an intake 303I proximate to, or at the top of, the reservoir 302 at the interior reservoir wall 304. The downward angle of the conduit 303 may allow water to free flow through the conduit under the force of gravity alone.

The size of the reservoir 302 may depend upon the size of the community served. Merely to be exemplary, it is estimated that the average American uses 82 gallons per year, so without accounting for commercial water uses, a municipality with 50,000 people would need a minimum reservoir 302 capacity of 1.4 billion gallons, but a reservoir size of 1.7 billion gallons would account for increased demand and drought protection plans to be implemented.

Source water may be let into the reservoir 302 through the outer reservoir wall 301 to control, i.e., to maintain, the suitable level of water in the reservoir. The outer reservoir wall 301 may include a tube or trough 301T through or upon which source water may be admitted into the reservoir 302. The source water admitted via the tube or trough may deliver water into the reservoir 302 near its top, or at/near its bottom, or anywhere in between. The water admitted into the reservoir 302 may be fresh water or salt water, and may be obtained from any body of water, including, but not limited to, being fed directly by a natural body of water, such as a lake, a river, the ocean, etc. In one embodiment, all or just some portions of the system 300 may be positioned below the body of water that may supply the reservoir 302, and may more advantageously utilize gravitation potential energy of the height differential (e.g., a portion of the flow of water in a river may be diverted to flow through a trough directly into the top of the reservoir 302). In another embodiment, water may be drafted into, and flow through, the tube 301T and be delivered into the reservoir 302 with little or no input being required, once the gravitational flow of water through the downwardly angled conduit 303 has been initiated.

Positioned inside of, and proximate to, a bottom portion of the conduit 303, as seen in FIG. 3, may be a turbine 305. Turbine 305 may be any suitable turbine device (see e.g., U.S. Pat. No. 3,986,787 to Mounton; U.S. Pat. No. 4,274,009 to Parker; U.S. Pat. No. 4,335,319 to Mettersheimer; and U.S. Pat. No. 8,360,720 to Schlabach).

The water flowing downward through the conduit 303, as indicated by the arrow in FIG. 3, causes the turbine 305 to spin, which rotation may be mechanically coupled to generator 306. The generator 306 converts the rotational kinetic energy obtained from turbine 305 into alternating currents (AC) of electricity. A transformer 308 may be used to convert the AC current generated by the generator 306 and turbine 305 into higher voltage current. The high voltage current may be transmitted via a high voltage power line 309 to a municipal power grid or other desired location. The generator 306 and transformer 308 may be housed in a powerhouse 307.

After acting on, and passing the turbine 305, the water may exit the conduit through an outlet 310 and be directed by a pipe 330 to enter a pump 311 via intake 312. The pump 311 may be a centrifugal pump, and may be configured to produce flowrates of at least 3000 gallons/minute. The flow of water out of the pump 311 through the outtake 313 may be directed by a pipe 331 to a carbon and sediment filtration unit 315. The pipe 331 may include a suitable valve 314A (e.g., a ball valve) that is configured to be actuated to turn off and/or to turn on the flow of water between the centrifugal pump 311 and the filtration unit 315.

The filtration unit 315 is used to remove volatile organic compounds (VOCs) and some heavy metals (e.g., lead, mercury, copper, cadmium, chromium (III and VI), arsenic, barium, radium, selenium), and to filter our particulate that are 5-microns and larger. The filtration unit 315 may be formed of a stainless-steel housing that may house: a first mesh screen 318 that may be made of stainless steel and have openings that are 5-micron in size (or smaller if possible); a chamber 317 that may contain activated carbon for removing volatile organic compounds, some nonorganic chemicals, and heavy metals from the water; and a second mesh screen 318.

The water may exit the filtration unit 315 and be conducted via pipe 332 to a UV sterilization unit 319. The pipe 332 may include a needle valve 318A that may cooperate with a pressure gauge 316B, to ensure that the water pressure is within safe system operating parameters, and which may also be used to control the flow rate of water from the unit.

The needle valve 318A may cooperate only with pressure gauge 316B, but depending on the size of the system an additional needle valve may have to be added before pressure gauge 316A to further control the system pressure. There is a one-to-one relationship between needle valves and pressure gauges. A needle valve needs to be placed before a pressure gauge to accurately determine the increase or decrease in pressure you are exerting on the system by operating the needle valve.

The UV sterilization unit 319 may include one or more ultraviolet (UV) bulbs 320 configured to emit light capable of removing microbes such as bacteria, viruses, and even fungi. The one or more ultraviolet (UV) bulbs 320 may preferably emit light UVC light, which is an ultraviolet light with a wavelength between 200-280 nanometers, and which wavelength is shorter than the wavelengths of UVA and UVB light, but has been shown to be more powerful/effective at destroying bacteria, viruses, and fungi.

The water may exit the UV sterilization unit 319 and be conducted via pipe 333 to the intake 322 of a reverse osmosis unit 323. The pipe 333 may include a needle valve 318B that may cooperate with an inline pressure gauge 321 to ensure that the water pressure is within safe system operating parameters. The reverse osmosis unit 323 may include one or more ceramic reverse osmosis membranes 325, each of which may have a filtration accuracy of 0.0001, and may be used to remove micro plastic particles from the filtered water.

The needle valve 318B cooperates with inline pressure gauge 321 to ensure safe system operating pressure, more specifically it is there before the reverse osmosis components of the system to ensure that the ceramic membrane is not fouled, e.g., not cracked by excess pressure.

Wastewater including the filtered micro plastic may be discharged from the reverse osmosis unit 323 via a first outtake 324, and may be discharged via pipe 327 to a municipal sewer system or a private wastewater management service or some other safe system for disposal or use of the micro plastic. A second outtake, outtake 326, may be used to deliver micro plastic free product water to a re-mineralization unit 328 that may be used to re-mineralize the microplastic free water, making it more healthful for human consumption. The re-mineralized water may exit the re-mineralization unit 328 via a pipe 329 that may deliver re-mineralized microplastic free water to a main water distribution system utilized by the municipality or to a bottling facility for commercial distribution.

Note that valves (e.g., a ball valve or any other suitable valve) may be used to shut off the flow of water at other locations in the system, as illustrated in FIG. 3, e.g., valve 314B may be used to turn on/off the flow of water from the carbon/sediment filtration unit 315 to UV sterilization unit 319; valve 314C may be used to turn on/off the flow of water from UV sterilization unit 319 to reverse osmosis unit 323; valve 314D may be used to turn on/off the flow of discharge water from the reverse osmosis unit 323 to a municipality sewer system; valve 314E may be used to turn on/off the flow of microplastic free water from reverse osmosis unit 323 to re-mineralization unit 328; and/or valve 314F may be used to turn on/off the flow of re-mineralized microplastic free water from re-mineralization unit 328 to the main water distribution system utilized by municipality.

Figure 4:
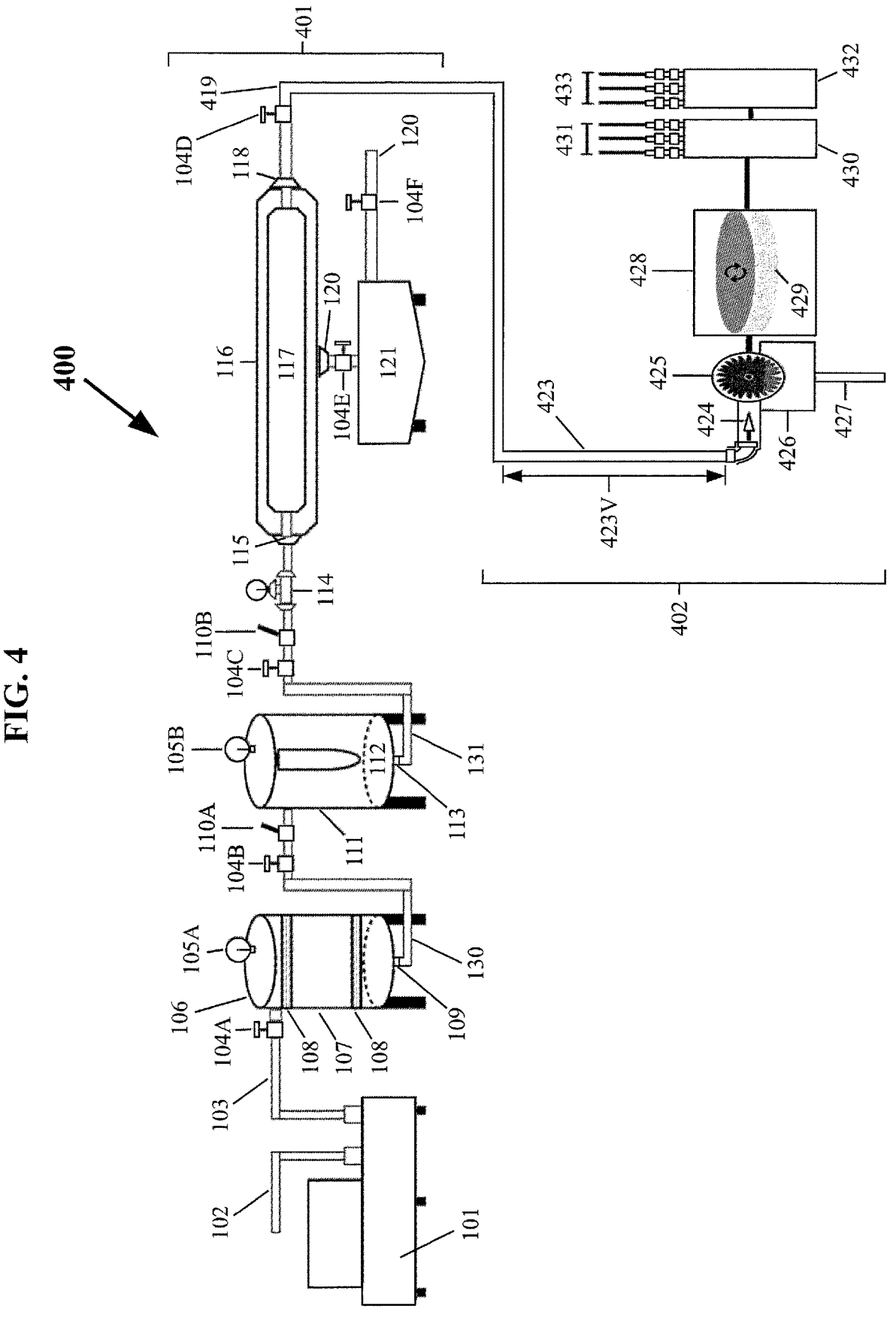
FIG. 4 illustrates components and an arrangement for a system configured for water filtration for a municipality and the like, and which is further configured to harness hydro-electric power via discharge from the water filtration portion of the system.

FIG. 4 illustrates a system 400 that includes a first portion 401 with component parts and an arrangement configured to purify water, and a second portion 402 with component parts and an arrangement to harness hydroelectric power via wastewater discharged from the water purification portion of the system.

The water purification portion 401 of the system 400 shown in FIG. 4 is the same as the entire water purification system 200 illustrated in FIG. 2, except that the pipe 119 in FIG. 2 is replaced by pipe 419 in FIG. 4. A discussion of each of those component parts of system 200 is therefore not repeated, and only those components of the second portion 402 of system 400 are described hereinafter.

The pipe 419 may conduct discharge water including filtered microplastic particulates from the reverse osmosis unit 116 to the hydroelectric generating components of the second portion 401 of system 400.

The second portion 402 of system 400 for generating electricity is located at a different elevation than the water purification portion 401 of the system 400, preferably being about 75 feet lower in elevation, and more preferably being 100 feet lower, and most preferably being 125 feet or more lower.

As such, a pipe portion 423 of pipe 419 may have a vertical orientation 423V, and an extent being sufficient to satisfy the desired elevation difference noted above. The discharge water undergoing the vertical drop through pipe portion 423 generates kinetic energy inherent in the water's velocity. The high velocity discharge water is thereafter delivered/directed into spear valve 424. The spear valve 424 operates to direct the discharge water into fan blades of a turbine 425 to maximize energy transfer.

More specifically, the spear valve 424 maximizes the transfer of energy by augmenting the pressure of the discharge water and directing it towards the turbine 425 at the correct angle. Placing the spear valve 424 before the turbine 425 better enables harnessing of the pressure from the pump 101 of the filtration portion of the system, the increased velocity from the vertical drop 423V, and increased pressure through the valve itself, resulting in more available kinetic energy available for capture by the turbine.

Note that the turbine 425 may also be oriented so that it may be acted upon by the discharge water while flowing in the downward direction.

For either arrangement, the turbine 425 is caused to rotate by the moving discharge water, and the rotational kinetic energy supplies power to a generator 429. The generator 429, which may be housed in a housing 428, converts the rotational kinetic energy derived from turbine 425 into alternating currents (AC) of electricity. A first transformer 430 may be used to convert the AC currents generated by the generator 429 and turbine 425 into high voltage currents, which may be output through a high voltage power line 431 directing usable electricity to a municipal power grid or other desired location. A second transformer 432 may also be used to convert AC currents generated by the generator 429 and turbine 425 into high voltage currents, which may be output through high voltage power line 433.

A basin 426 may be used for runoff water collection after the discharge water has acted upon, and passed through, the turbine 425, and which basin may be in fluid communication with a pipe 427 that may direct the runoff water to a municipal sewer system or another system that may collect/ concentrate the microplastic in the discharge water for subsequent use.

While illustrative implementations of one or more embodiments of the disclosed system are provided herein-above, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

LIST OF REFERENCE CHARACTERS
UTILIZED IN FIG. 1

(1) Input water pipe.
(2) Intake for primary circulating pump (3).
(3) Primary circulating pump.
(4) Outtake of primary circulating pump (3).
(5) Pipe connecting outtake (4) of the primary circulation pump (3) to pressure gauge (6A).
(6A) Pressure gauge, 0-120 psi.
(6B) Pressure gauge, 0-120 psi.
(6C) Pressure gauge, 0-120 psi.
(7) Pipe connecting pressure gauge (6A) to intake (8) of pre-filtration unit (9).
(8) Intake to pre-filtration unit (9).
(9) Pre-filtration unit.
(9H) Housing of pre-filtration unit (9).
(10) Primary sediment filtration screen.
(11) Primary carbon block.
(12) Secondary carbon block.
(13) Secondary sediment filtration screen.
(14) Outtake of pre-filtration unit (9).
(15) Pipe connecting outtake (14) of pre-filtration unit 9 to elbow joint (16A).

(15') Pipe connecting outtake (14) of pre-filtration unit 9 to needle valve (20A).
(16a) Elbow joint connecting pipe (15) to pipe (17).
(16b) Elbow joint connecting pipe (35) to pipe (36).
(16c) Elbow joint connecting pipe (47) to intake (48) of bottle washing pressure pump (49).
(16d) Elbow joint connecting outtake (55) of bottling station pump to bottle filling unit (58).
(17) Pipe connecting elbow joint (16A) to T-joint (18).
(18) T-joint.
(19) Pipe connecting elbow joint (18) to needle valve (20A).
(20A) Needle valve used to control water pressure.
(20B) Needle valve used to control water pressure.
(21) Pipe connecting needle valve (20A) to pressure gauge (6B).
(22) Pipe connecting pressure gauge (6B) to intake (23) of primary reverse osmosis unit (25).
(23) Intake of primary reverse osmosis unit (25).
(24) Ceramic reverse osmosis membrane.
(25) Primary reverse osmosis unit (25).
(26) Secondary outtake of primary reverse osmosis unit (25).
(27) Primary outtake of reverse osmosis unit (25).
(28) Pipe connecting outtake (26) to ball valve (29A).
(28') Pipe connecting outtake (26) to ball valve (29A).
(29A) Ball valve used to stop the flow of water.
(29B) Ball valve used to stop the flow of water.
(29C) Ball valve used to stop the flow of water.
(29D) Ball valve used to stop the flow of water.
(30) Primary intake to discharge storage tank (31).
(31) Discharge storage tank.
(32) Pipe connecting outtake (27) of primary reverse osmosis unit (25) to ball valve (29B).
(32') Pipe connecting outtake (27) of primary reverse osmosis unit (25) to ball valve (29B).
(33) Pipe connecting ball valve (29B) to intake (34) of bottling station pump (54).
(34) Bottling station intake, feeds directly to primary pressure pump (54).
(35) Pipe connecting T-joint (18) to elbow joint (16B).
(36) Pipe connecting elbow joint (16B) to needle valve (20B).
(37) Pipe connecting needle valve (20B) to pressure gauge (6C).
(38) Pipe connecting pressure gauge (6C) to intake 39 of secondary reverse osmosis unit (41).
(39) Intake of secondary reverse osmosis unit (41).
(40) Ceramic reverse osmosis membrane.
(41) Secondary Reverse Osmosis Unit.
(42) Primary outtake of the secondary reverse osmosis unit (41).
(43) Secondary outtake of the secondary reverse osmosis unit (41).
(44) Pipe connecting secondary outtake (43) to ball valve (29C).
(45) Secondary Intake to discharge storage tank (31).
(46) Pipe connecting primary outtake (42) to ball valve (29D).
(46') Pipe connecting primary outtake (27) to ball valve (29D).
(47) Pipe connecting ball valve (29D) to elbow joint (6C).
(48) Intake of bottle washing pressure pump.
(49) Bottle washing pressure pump.
(50) Outtake of bottle washing pressure pump (49).
(51) Pipe connecting outtake (50) of bottle washing pump (49) to cleaning nozzles (52N).

(52) Bottle washing station.

(52N) Cleaning nozzles of bottle washing station 52.

(53) Conveyor belt.

(54) Bottling station pressure pump.

(55) Pipe connecting the bottling station pressure pump (54) to elbow joint (16D).

(56) Pipe connecting elbow joint (16B) to intake (57) of bottle filling unit (58).

(57) Intake of bottle filling unit (58).

(58) Bottle filling unit.

(58N) Output nozzle of bottle filling unit (58).

(59) Remineralization unit.

(60) Mineral dispenser of remineralization unit (59).

(60N) Nozzle of mineral dispenser (60).

(61) Corking unit.

(62) Corking piston.

(63) Storage area for sealed microplastic-free water bottles.

(64) Bottling and re-mineralization station.

LIST OF REFERENCE CHARACTERS UTILIZED IN FIG. 2

(101) Centrifugal pump.

(102) Source water intake.

(103) Centrifugal pump outtake.

(104a) Valve to turn on/off flow of water from pump (101) to filtration unit (106).

(104b) Valve to turn on/off flow of water from filtration unit (106) to UV sterilization unit (111).

(104c) Valve to turn on/off flow from UV sterilization unit (111) to reverse osmosis unit (116).

(104d) Valve to turn on/off flow of discharge water from reverse osmosis unit (116).

(104e) Valve to turn on/off the flow of water from reverse osmosis unit (116) to re-mineralization unit (121).

(104f) Valve used to turn on/off flow of water from re-mineralization unit (121) to main water distribution system utilized by municipality.

(105a) Pressure gauge used to ensure water pressure is within safe parameters.

(105b) Pressure gauge used to ensure water pressure is within safe parameters.

(106) Carbon and sediment filtration unit used to remove VOC, heavy metals, and particulates.

(107) Chamber for activated carbon.

(108) 5-micron stainless steel mesh screen.

(109) Carbon and sediment filtration unit outtake.

(110a) Needle valve to control the flow rate of water from filtration unit (106) to UV sterilization unit (111).

(110b) Needle valve to control the flow rate of water from UV sterilization unit (111) to reverse osmosis unit (116).

(111) UV sterilization unit.

(112) UV bulbs emitting light capable of destroying microbes such as bacteria, viruses, and fungi.

(113) UV sterilization unit (111) outtake.

(114) Inline pressure gauge used to ensure water pressure is within safe parameters.

(115) Reverse osmosis unit (116) intake.

(116) Reverse osmosis unit.

(117) Ceramic reverse osmosis membrane with filtration accuracy of 0.0001.

(118) Discharge water outtake.

(119) Pipe sending discharge water to municipal sewer system.

(120) Microplastic free product water outtake.

(121) Re-mineralization unit used to re-mineralize microplastic free water.

(122) Pipe sending re-mineralized microplastic free water to main water distribution system utilized by municipality.

LIST OF REFERENCE CHARACTERS UTILIZED IN FIG. 3

(301) Outer reservoir wall of the reservoir (302).

(301T) Tube or Trough for admitting water into the reservoir (302).

(302) Reservoir used to store source water.

(303) Conduit allowing water to flow out of reservoir (302).

(304) Interior reservoir wall.

(305) Turbine used to supply power to generator (306).

(306) Generator is used to turn kinetic energy from turbine (305) into alternating current.

(307) Powerhouse, houses generator (306) and turbine (305).

(308) Transformer used to convert AC current generated by the generator (306) and turbine (305) into high voltage currents.

(309) High voltage power line directing usable electricity to power grid or other desired location.

(310) Conduit outlet.

(311) Centrifugal pump.

(312) Source water intake.

(313) Centrifugal pump outtake.

(314a) Valve used to turn on/off flow of water from centrifugal pump (311) to filtration unit (315).

(314b) Valve used to turn on/off flow of water from carbon/sediment filtration unit (315) to UV sterilization unit (319).

(314c) Valve used to turn on/off the flow of water from UV sterilization unit (319) to reverse osmosis unit (323).

(314d) Valve used to turn on/off the flow of discharge water from reverse osmosis unit (323) to municipality sewer system.

(314e) Valve used to turn on/off the flow of microplastic free water from reverse osmosis unit (323) to re-mineralization unit (328).

(314f) Valve used to turn on/off the flow of re-mineralized microplastic free water from re-mineralization unit (328) to main municipal water distribution system.

(315) Carbon and sediment filtration unit used to remove VOC, heavy metals and particulates.

(316a) Pressure gauge used to measure water pressure to help ensure it is within safe parameters.

(316b) Pressure gauge used to measure water pressure to help ensure it is within safe parameters.

(317) Chamber for activated carbon.

(318) Stainless steel mesh screen.

(318a) Needle valve used to control flow rate of water from carbon and sediment filtration unit (315) to UV sterilization unit (319).

(318b) Needle valve used to control flow rate of water from UV sterilization unit (319) to reverse osmosis unit (323)

(319) UV sterilization unit.

(320) UV bulbs emitting light to destroy microbes such as bacteria and viruses, and fungi.

(321) Inline pressure gauge used to ensure water pressure is within safe parameters.

(322) Reverse osmosis unit intake.

(323) Reverse osmosis unit.

(324) Discharge water outtake.

(325) Ceramic reverse osmosis membrane.

(326) Microplastic free product water outtake.

(327) Pipe sending water to municipal sewer system or private wastewater management.

(328) Re-mineralization unit used to re-mineralize micro-plastic free water.

(329) Pipe sending re-mineralized microplastic free water to main water distribution system utilized by munici-pality or to bottling facility for commercial distribution.

LIST OF REFERENCE CHARACTERS
UTILIZED IN FIG. 4

(101) Centrifugal pump.

(102) Source water intake.

(103) Centrifugal pump outtake.

(104a) Valve to turn on/off flow of water from pump (101) to filtration unit (106).

(104b) Valve to turn on/off flow of water from filtration unit (106) to UV sterilization unit (111).

(104c) Valve to turn on/off flow from UV sterilization unit (111) to reverse osmosis unit (116).

(104d) Valve to turn on/off flow of discharge water from reverse osmosis unit (116).

(104e) Valve to turn on/off the flow of water from reverse osmosis unit (116) to re-mineralization unit (121).

(104f) Valve used to turn on/off flow of water from re-mineralization unit (121) to main water distribution system utilized by municipality.

(105a) Pressure gauge used to ensure water pressure is within safe parameters.

(105b) Pressure gauge used to ensure water pressure is within safe parameters.

(106) Carbon and sediment filtration unit used to remove VOCs, heavy metals, and particulates.

(107) Chamber for activated carbon.

(108) 5-micron stainless steel mesh screen.

(109) Carbon and sediment filtration unit outtake.

(110a) Needle valve to control the flow rate of water from filtration unit (106) to UV sterilization unit (111).

(110b) Needle valve to control the flow rate of water from UV sterilization unit (111) to reverse osmosis unit (116).

(111) UV sterilization unit.

(112) UV bulb(s) emitting light capable of killing microbes such as bacteria, viruses, and fungi.

(113) UV sterilization unit (111) outtake.

(114) Inline pressure gauge.

(115) Reverse osmosis unit (116) intake.

(116) Reverse osmosis unit.

(117) Ceramic reverse osmosis membrane.

(118) Discharge water outtake of the ceramic reverse osmosis membrane.

(400) Water purification and hydroelectric generation system.

(401) Water purification portion of system (400).

(402) Hydroelectric generating portion of system (400).

(419) Pipe sending discharge water to hydroelectric com-ponents of system.

(420) Microplastic free product water outtake.

(421) Re-mineralization unit used to re-mineralize micro-plastic free water.

(422) Pipe sending re-mineralized microplastic free water to main water distribution system utilized by a munici-pality.

(423) Pipe sending water vertically downward at least 100 feet to generate kinetic energy and water velocity, and deliver/direct water into spear valve (424).

(424) Spear valve used to direct water into fan blades of turbine (425) at the correct angle to maximize energy transfer.

(425) Turbine used to supply power to generator (429) when it is pushed by water flowing from pipe (423) through spear valve (424).

(426) Runoff water collection basin.

(427) Pipe sending runoff water to municipal sewer system.

(428) Powerhouse used to house generator (429).

(429) Generator used to turn kinetic energy from turbine (425) into alternating currents (AC) of electricity.

(430) Transformer used to convert AC currents generated by the generator (429) and turbine (425) into high voltage currents.

(431) High voltage power line directing usable electricity to municipal power grid or other desired location.

(432) Transformer used to convert AC currents generated by the generator (429) and turbine (425) into high voltage currents.

(433) High voltage power line directing usable electricity to municipal power grid or other desired location.

The invention claimed is:

1. A system configured for both electricity generation, and water purification and re-mineralization, said system com-prising:

a reservoir, said reservoir comprising at least one wall having a height configured to store a volume of water;

a tube configured to admit the water into said reservoir;

a conduit, said conduit having an opening at a first end being in fluid communication with a top portion of said reservoir and an opening at a second end being posi-tioned at a lower height than said opening at said first end, said conduit thereby being disposed in a down-ward direction to cause gravitational potential energy resulting from a height differential between said open-ing at said first end and said opening at said second end to create a flow of water from said reservoir down said conduit;

a turbine, said turbine positioned in said conduit between said first end and said second end; wherein said turbine is configured to rotate as a result of the flow of water down said conduit;

a generator, said generator being coupled to said turbine, and said generator being configured to convert rota-tional kinetic energy obtained from said turbine into alternating current;

a power line configured to transmit the generated alter-nating current to a municipal power grid;

a pump, said pump configured to receive the water from said second end of said conduit and to pump said water through a water purification and re-mineralization sys-tem, said water purification and re-mineralization sys-tem comprising:

a sediment filtration unit configured to remove volatile organic compounds, heavy metals, and particulates from the pumped water, to thereby output filtered water;

a sterilization unit configured to emit ultraviolet light that kills microbes in the filtered water;

a reverse osmosis unit configured to remove micro plastic particles from the filtered water; said reverse osmosis unit comprising:

a first outtake, said first outtake configured for discharge of filtered micro plastic particles and wastewater to a municipal sewer system; and a second outtake, said second outtake configured to deliver micro plastic free water;

a re-mineralization unit configured to re-mineralize the micro plastic free water; and a system outtake configured to deliver the re-mineralized micro plastic free water to a municipal water distribution system or a bottling facility.

2. The system according to claim 1, further comprising: one or more valves configured to shut off and/or turn on water flow through said system.

3. The system according to claim 2, wherein said tube is configured to admit the water into a top of said reservoir.

4. The system according to claim 3, wherein said turbine is secured in said conduit at a position being in closer proximity to said second end than said first end.

5. The system according to claim 4, further comprising: a transformer configured to convert the alternating current generated by said generator into a higher voltage current.

6. The system according to claim 5, further comprising:

a pressure gauge configured to measure pressure in said system;

a needle valve; and wherein said pressure gauge and said needle valve are configured to adjust the pressure to be below a safe upper limit, and to control a water flow rate.

7. The system according to claim 6, wherein said sterilization unit is configured to emit the ultraviolet light at a wavelength between 200-280 nanometers.

8. A system configured for electricity generation, and for water purification and re-mineralization with delivery to a municipal water distribution system, said system comprising:

a reservoir, said reservoir comprising at least one wall having a height configured to store a volume of water;

means for admitting the water into said reservoir;

a conduit, said conduit having an opening at a first end being in fluid communication with a top portion of said reservoir and an opening at a second end being positioned at a lower height than said opening at said first end, said conduit thereby being disposed in a downward direction to cause gravitational potential energy resulting from a height differential between said opening at said first end and said opening at said second end to create a flow of water from said reservoir down said conduit;

a turbine, said turbine positioned in said conduit between said first end and said second end; wherein said turbine is configured to rotate as a result of the flow of water down said conduit;

a generator, said generator being coupled to said turbine, and said generator being configured to convert rotational kinetic energy obtained from said turbine into alternating current;

a power line configured to transmit the generated alternating current to a municipal power grid;

a pump, said pump configured to receive the water from said second end of said conduit and to pump said water through a water purification and re-mineralization system, said water purification and re-mineralization system comprising:

a sediment filtration unit configured to remove volatile organic compounds, heavy metals, and particulates from the pumped water, to thereby output filtered water;

a sterilization unit configured to emit ultraviolet light that kills microbes in the filtered water;

a reverse osmosis unit configured to remove micro plastic particles from the filtered water; said reverse osmosis unit comprising:

a first outtake, said first outtake configured for discharge of filtered micro plastic particles and wastewater to a municipal sewer system; and a second outtake, said second outtake configured to deliver micro plastic free water;

a re-mineralization unit configured to re-mineralize the micro plastic free water; and a system outtake configured to deliver the re-mineralized micro plastic free water to the municipal water distribution system.

9. The system according to claim 8, further comprising: one or more valves configured to shut off and/or turn on water flow through said system.

10. A system configured for electricity generation and for water purification with delivery to a municipal water distribution system, said system comprising:

a reservoir, said reservoir comprising at least one wall having a height configured to store a volume of water;

a tube or trough configured to admit the water into said reservoir;

a conduit, said conduit having an opening at a first end being in fluid communication with a top portion of said reservoir and an opening at a second end being positioned at a lower height than said opening at said first end, said conduit thereby being disposed in a downward direction to cause gravitational potential energy resulting from a height differential between said opening at said first end and said opening at said second end to create a flow of water from said reservoir down said conduit;

a turbine, said turbine positioned in said conduit between said first end and said second end; wherein said turbine is configured to rotate as a result of the flow of water down said conduit;

a generator, said generator being coupled to said turbine, and said generator being configured to convert rotational kinetic energy obtained from said turbine into alternating current;

a power line configured to transmit the generated alternating current to a municipal power grid;

a pump, said pump configured to receive the water from said second end of said conduit and to pump said water through a water purification and re-mineralization system, said water purification and re-mineralization system comprising:

a sediment filtration unit configured to remove volatile organic compounds, heavy metals, and particulates from the pumped water, to thereby output filtered water;

a sterilization unit configured to emit ultraviolet light that kills microbes in the filtered water;

a reverse osmosis unit configured to remove micro plastic particles from the filtered water; said reverse osmosis unit comprising:

a first outtake, said first outtake configured for discharge of filtered micro plastic particles and wastewater; and a second outtake, said second outtake configured to deliver micro plastic free water; and a system outtake configured to deliver the micro plastic free water to the municipal water distribution system.

11. The system according to claim 10, further comprising: one or more valves configured to shut off and/or turn on water flow through said system.

*    *    *    *    *